US009034431B2

(12) United States Patent
Deevi et al.

(10) Patent No.: US 9,034,431 B2
(45) Date of Patent: May 19, 2015

(54) PREPARATION OF INTERMETALLICS BY METALLO-ORGANIC DECOMPOSITION

(75) Inventors: Sarojini Deevi, Midlothian, VA (US); Yezdi B. Pithawalla, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 1205 days.

(21) Appl. No.: 12/488,169

(22) Filed: Jun. 19, 2009

(65) Prior Publication Data

US 2009/0275466 A1 Nov. 5, 2009

Related U.S. Application Data

(62) Division of application No. 10/460,617, filed on Jun. 13, 2003, now abandoned.

(51) Int. Cl.
| B05D 3/02 | (2006.01) |
| A24B 15/28 | (2006.01) |
| B01J 23/80 | (2006.01) |
| B22F 9/24 | (2006.01) |
| B22F 9/30 | (2006.01) |
| C22C 1/04 | (2006.01) |

(52) U.S. Cl.
CPC .............. *A24B 15/288* (2013.01); *A24B 15/28* (2013.01); *A24B 15/287* (2013.01); *B01J 23/80* (2013.01); *B22F 9/24* (2013.01); *B22F 9/30* (2013.01); *C22C 1/0491* (2013.01); *B22F 2998/00* (2013.01)

(58) Field of Classification Search
CPC ........ A24B 15/288; C22C 1/0491; B22F 9/24
USPC ................................ 427/376.7, 212
See application file for complete search history.

(56) References Cited

U.S. PATENT DOCUMENTS

| 3,711,319 A | * | 1/1973 | Irikura et al. ................ 427/2.15 |
| 3,748,193 A | | 7/1973 | Cech et al. |
| 3,965,046 A | | 6/1976 | Deffeyes |
| 4,097,351 A | | 6/1978 | Caley et al. |
| 4,197,217 A | * | 4/1980 | Gartshore et al. ............ 502/314 |

(Continued)

FOREIGN PATENT DOCUMENTS

| EP | 427389 A1 | 5/1991 |
| EP | 0977212 A | 2/2000 |
| JP | 60251267 A | 12/1985 |

OTHER PUBLICATIONS

Robert W. Vest, "Electronic Films from Metallo-Organic Precursors", Ceramic Film and coatings, pp. 303-347, Noyes Publications, New Jersey, USA, Feb. 14, 1997.

(Continued)

*Primary Examiner* — Tabatha Penny
(74) *Attorney, Agent, or Firm* — Buchanan Ingersoll & Rooney PC

(57) ABSTRACT

A metallo-organic decomposition process for the preparation of intermetallic powders and films. A liquid mixture containing a first metal precursor and a second metal is heated to a temperature in a first temperature range so as to convert the first metal precursor to a first metal followed by heating to a temperature in a second temperature range so as to form an intermetallic compound by a solid state reaction between the first and second metals. The intermetallic compound can be used as a catalyst in cut filler and/or the filter of a cigarette.

17 Claims, 1 Drawing Sheet

(56) References Cited

U.S. PATENT DOCUMENTS

| | | | |
|---|---|---|---|
| 4,203,762 A | 5/1980 | Dansereau | |
| 4,317,460 A | 3/1982 | Dale et al. | |
| 4,463,030 A | 7/1984 | Deffeyes et al. | |
| 4,956,330 A | 9/1990 | Elliott et al. | |
| 5,050,621 A | 9/1991 | Creighton et al. | |
| 5,102,509 A | 4/1992 | Albon et al. | |
| 5,258,340 A | 11/1993 | Augustine et al. | |
| 5,269,830 A | 12/1993 | Rabin et al. | |
| 5,281,447 A | 1/1994 | Brady et al. | |
| 5,292,594 A | 3/1994 | Liburdi et al. | |
| 5,320,802 A | 6/1994 | Liu et al. | |
| 5,446,003 A | 8/1995 | Augustine et al. | |
| 5,494,704 A | 2/1996 | Ackerman | |
| 5,503,874 A | 4/1996 | Ackerman et al. | |
| 5,681,648 A | 10/1997 | Funada et al. | |
| 5,693,368 A | 12/1997 | Ackerman et al. | |
| 5,736,118 A | 4/1998 | Derleth et al. | |
| 5,850,047 A | 12/1998 | Tani et al. | |
| 6,015,917 A | 1/2000 | Bhandari et al. | |
| 6,143,432 A * | 11/2000 | de Rochemont et al. | 428/689 |
| 6,197,366 B1 | 3/2001 | Takamatsu | |
| 6,221,440 B1 | 4/2001 | Meyer et al. | |
| 6,251,339 B1 | 6/2001 | Beane et al. | |
| 6,262,129 B1 | 7/2001 | Murray et al. | |
| 6,277,263 B1 | 8/2001 | Chen | |
| 6,284,654 B1 | 9/2001 | Roeder et al. | |
| 6,395,406 B1 * | 5/2002 | Sangeeta | 428/650 |
| 6,555,411 B1 | 4/2003 | Bao et al. | |
| 6,635,348 B1 | 10/2003 | Hampden-Smith et al. | |
| 6,949,267 B2 | 9/2005 | Moini et al. | |
| 2002/0014453 A1 | 2/2002 | Lilly, Jr. et al. | |

OTHER PUBLICATIONS

Notification of Transmittal of the International Search Report and the Written Opinion of the International Searching Authority or the Declaration dated Sep. 17, 2004 for PCT/IB2004/002186.

* cited by examiner

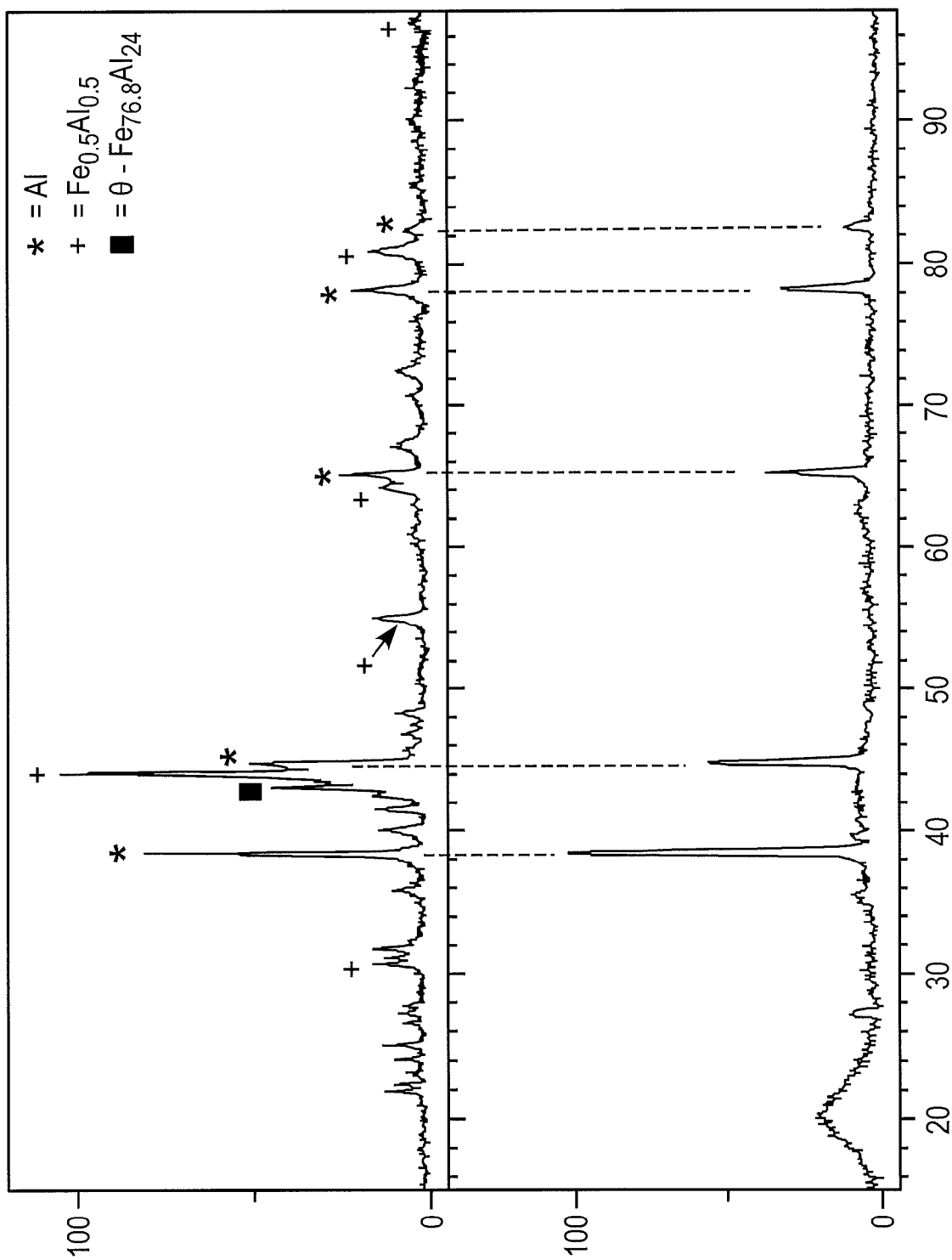

PREPARATION OF INTERMETALLICS BY METALLO-ORGANIC DECOMPOSITION

CROSS-REFERENCE TO RELATED APPLICATIONS

This application is a divisional application of U.S. application Ser. No. 10/460,617 entitled PREPARATION OF INTERMETALLICS BY METALLO-ORGANIC DECOMPOSITION, filed on Jun. 13, 2003 now abandoned, the entire contents of which is hereby incorporated by reference.

FIELD OF THE INVENTION

The invention relates generally to methods for preparing intermetallic compounds. The invention also relates to intermetallic catalysts, which are useful for removing one or more selected constituents from mainstream tobacco smoke. More particularly, the invention relates to smoking articles, filters, cut filler compositions and methods using an intermetallic catalyst.

BACKGROUND

A process for depositing a metal coating via the decomposition of volatile metal compounds using a glow discharge is disclosed in U.S. Pat. No. 6,221,440. The chemical and photochemical reduction of precursor metal salts to form metallic films and powders is disclosed in U.S. Pat. Nos. 6,262,129; 5,850,047 and 5,281,447. The modification of organometallic salts using organic reactants for the formation of films and powders is disclosed in U.S. Pat. Nos. 6,197,366 and 4,463,030.

The use of various coating processes to apply a metallurgical coating to ferrous-based powders, which are pressed and sintered to diffuse the coating into the powder, is disclosed in U.S. Pat. No. 6,251,339. The low temperature chemical vapor deposition synthesis of metallic films is disclosed in U.S. Pat. Nos. 5,503,874; 5,494,704 and 5,292,594.

Precious metal-based catalysts and transition metal-based catalysts have been used to purify exhaust gases containing carbon monoxide, nitrogen oxide, and hydrocarbons. The use of catalysts in smoking articles is disclosed in U.S. Pat. Nos. 4,317,460; 4,956,330; 5,050,621; 5,258,340 and 5,446,003.

Despite the developments to date, there is interest in improved and more efficient methods for preparing intermetallic thin films and powders. Preferably, such methods and compositions should not involve expensive or time consuming manufacturing and/or processing steps. There also is interest in improved and more efficient methods and compositions for reducing the amount of targeted gaseous species in the mainstream smoke of a cigarette during smoking.

SUMMARY

A preferred method of forming an intermetallic compound comprises (i) forming a liquid mixture containing a first metal precursor and a second metal; (ii) preparing a powder mixture by heating the liquid mixture to a temperature in a first temperature range so as to convert the first metal precursor to a first metal; and (iii) heating the powder mixture to a temperature in a second temperature range so as to form the intermetallic compound by a solid state reaction between the first and second metals.

The first and second metals can comprise at least one element selected from the group consisting of Mg, Al, Ti, Fe, Co, Ni, Cu, Zn, Mo, Ru, Rh, Pd, Ag, Sn, Ce, W, Re, Os, Ir, Pt and Au. According to a preferred embodiment, the first metal precursor consists essentially of a metallo-organic compound. The metallo-organic compound can be selected from ethyl hexanoates, acetyl acetonates, oxalates and citrates. According to one embodiment, the liquid mixture consists essentially of the first metal precursor, the second metal and a solvent.

The second metal can comprise a nanoscale powder and/or the intermetallic compound can comprise a nanoscale powder. Exemplary intermetallic compounds include iron aluminides, titanium aluminides, nickel aluminides, copper aluminides, copper-zinc intermetallics and brass. According to one embodiment, the intermetallic compound is substantially oxygen-free.

The intermetallic compound can be formed on a support by coating a support with the liquid mixture and heating the coated support. Alternatively, the liquid mixture can be heated during the coating process. The support can be coated by spraying, dipping or spin coating. A polymer former can be added to the liquid mixture in order to control properties of the liquid mixture. The support can be a porous support and can comprise organic materials such as tobacco or inorganic materials such as ceramic, metal, plastic or paper. Exemplary supports include silica gel beads, carbon/graphite foam, activated carbon and tobacco cut filler.

The step of heating to a first temperature range can comprise heating to a temperature in the range of from about 200 to 350° C., and the step of heating to a second temperature range can comprise heating to a temperature in the range of from about 400 to 750° C. By way of example, the step of preparing and the step of heating can comprise heating with an infrared lamp or with a furnace.

According to a preferred embodiment, the step of preparing a powder mixture can comprise heating in an oxidizing or non-oxidizing atmosphere and the step of heating the powder mixture to a second temperature range can comprise heating in a non-oxidizing atmosphere. The heating can also be carried out in a reducing atmosphere and can be done at about atmospheric pressure.

A method of making a cigarette comprises incorporating the intermetallic powder in cut filler, cigarette paper and/or a filter of the cigarette.

BRIEF DESCRIPTION OF THE DRAWINGS

FIG. 1 is an x-ray diffraction pattern of an FeAl intermetallic formed by thermal decomposition of iron ethylhexanoate on nanoscale aluminum powder.

DETAILED DESCRIPTION OF THE PREFERRED EMBODIMENTS

Methods of preparing intermetallic thin films and powders by thermal decomposition of metallo-organic compounds are described herein. The methods for making intermetallics use at least one metal precursor, and involve optionally depositing the at least one metal precursor on or within a support and thermally treating the precursor and the support as described herein, such that the metal precursor decomposes to form a constituent metal that reacts with a second metal to form an intermetallic compound.

Intermetallic compounds constitute a unique class of metallic materials that form long-range ordered crystal structures. Such materials form when atoms of two metals combine in certain proportions to form crystals with a different structure from that of either of the two constituent metals (e.g., NiAl, CuZn, etc.). If desired, additional elements can be combined with the metals of the intermetallic compound. The metals can comprise metallic (e.g., transition metals) or semi-metallic (e.g., Al, Si, etc.) elements.

Metallo-organic decomposition can be used to prepare nanoscale intermetallic powders. Nanoscale powders are a class of materials whose distinguishing feature is that their average grain or other structural domain size is below about 100 nanometers. Nanoscale powders offer the potential for very high sintering rates at lower temperatures. They also have very high surface area to volume ratios, which makes them attractive for catalytic applications.

Intermetallic films and powders can be prepared by metallo-organic decomposition (MOD) advantageously without the need for vacuum or high temperature processing. According to a preferred method, a first metal precursor solution is combined with a second metal to form a liquid mixture. The liquid mixture can comprise substrate material, such as nanoscale particles. As described herein the second metal can be in the form of a metal substrate such as nanoscale metal particles. The second metal is preferably different than the first metal. The liquid mixture, which is preferably a homogeneous mixture, can be heated to above the decomposition temperature of the first metal precursor to form a powder mixture. Heating to above the decomposition temperature of the first metal precursor can remove the liquid from the liquid mixture and convert the first metal precursor to the first metal. If desired, the second metal can be present in the liquid mixture in the form of a second metal precursor, which is converted to the second metal during the heating step. The powder mixture is then heated to a reaction temperature that can cause a solid state reaction between the first metal and second metal to form the intermetallic compound.

The MOD process starts with a precursor containing the desired metallic or semi-metallic element(s) dissolved in a suitable solvent. The process can involve a single precursor bearing one or more metals or the process can involve multiple metal precursors that are combined in solution to form a liquid mixture. As discussed above, the liquid mixture can optionally comprise a substrate or support material, such as nanoscale powder.

One or more precursors comprising one or more metals can be applied to a substrate or support before, during and/or after heating. For example, a metal precursor comprising a single metal can be combined with a metal substrate to form a liquid mixture. The liquid mixture can be heated to a temperature above a reaction temperature wherein the metal in the metal precursor and the metal in the metal substrate can combine to form the intermetallic compound. The intermetallic compound can be in the form of a thin film on an exposed surface of the substrate. As a further example, a first metal precursor can be combined with a second metal precursor to form a liquid mixture that is heated to a temperature above a reaction temperature to form the intermetallic compound. The intermetallic compound can be in the form of a powder, which can be optionally coated onto a substrate. Also, rheology adjusters can optionally be added to the liquid mixture to control the solution viscosity, surface tension, etc.

The precursor(s) can be applied to a substrate using conventional mechanical techniques in combination with optional masking techniques. Such mechanical techniques include, for example, spraying, spinning, dipping, flow coating, roller coating, brushing, etc. Dispensers can be utilized to deliver the liquid mixture in the form of droplets or powder on a substrate. For example, a commercially available micropipetting apparatus can be adapted to dispense droplet volumes of 5 nanoliters or smaller from a capillary tube. Such droplets can fit within a region having a diameter of 300 microns or less when a non-wetting mask is employed. The liquid mixture can also be dispensed using a deposition apparatus such as those commonly employed in the ink-jet printing field. Such ink-jet dispensers include, for example, the pulse pressure type, the bubble jet type, the continuous ink jet type and the slit jet type.

According to a preferred embodiment, first and second metal precursors are combined and heated to form an intermetallic compound from the metals in the respective precursor solutions. According to another preferred embodiment, a first metal precursor solution is coated on a second metal substrate and the precursor solution and substrate are heated to form an intermetallic compound from the metal in the precursor solution and the metal in the substrate.

The liquid mixture is initially heated to above the decomposition temperature of the metal precursor(s). The heating causes the evaporation of liquid from the liquid mixture and thermal decomposition of the precursor(s) to form at least one metal.

The decomposition temperature of the metal precursor is the temperature at which the ligands substantially dissociate (or volatilize) from the metal atoms. During this process the bonds between the ligands and the metal atoms are broken such that the ligands are volatilized or otherwise separated from the metal. Preferably all of the ligand(s) decompose. However, films and powders may also contain carbon obtained from partial decomposition of the organic or inorganic components present in the metal precursors and/or solvent.

The thermal decomposition temperature of the metal precursor(s) is preferably lower than the degradation temperature of the metals. The degradation temperature of the metals is a temperature sufficiently high to cause the metals to be removed through chemical reaction with gases that are present during thermal treatment. Degradation of the metal precursors can produce intermediate metal compounds such as metal oxides or metal sulfides. When decomposition of the metal precursors occurs, it occurs at a temperature sufficient to substantially remove the ligands from the metals while leaving the metals behind as metal atoms, compounds or intermediates.

Formation of an intermetallic compound having a desired atomic ratio of a first metal to a second metal may be enhanced if the thermal decomposition is performed in the substantial absence of an oxidizing agent, and preferably in the presence of a reducing gas such as hydrogen, nitrogen and mixtures thereof.

Heating to a reaction temperature causes a solid state reaction between the metals in order to produce an intermetallic film or powder. As described below, the heating steps can be carried out at or near atmospheric pressure in an air, oxygen, inert or reducing atmosphere. By heating to the decomposition temperature in air or oxygen, for example, organic components including carbon can be more efficiently removed. Heating to the reaction temperature in air or oxygen can be used to prepare metal oxide powders and films, while heating in reducing or in an inert atmosphere can be used to prepare intermetallics that are substantially oxygen free. The term substantially oxygen free is intended to refer to intermetallics that comprise less than about 500 ppm, preferably less than about 100 ppm oxygen. Reactive gases or gas mixtures can also be used to prepare borides, carbides and sulphides. Heating in nitrogen or ammonia, for example, may produce a nitride film or powder.

One advantage of MOD processing is the accessibility of equilibrium phases at relatively low temperatures. Low temperature processing can enable the synthesis of coatings on support materials with low thermal budget requirements, such as resins and plastics that cannot be heated to elevated temperatures. For example, two metal precursors can be used to form the intermetallic phase on a non-metallic support. The precursors can be combined with the support before or during the steps of heating or, alternatively, the intermetallic can be formed and later combined with a support. The support can be metal; plastic; semiconductor; polymer; paper such as cigarette paper and/or ceramic, such as a silica gel bead, carbon/graphite foam, activated carbon or an organic material such as tobacco cut filler.

Low temperature processing has the additional advantage of obviating the need to match precursor volatility for multi-component systems. Without wishing to be bound by theory, it is believed that the low temperature access to equilibrium phases can be achieved because the various components are mixed in solution at the molecular level. Hence, the diffusion distances required to form the equilibrium phase are small. The molecular level mixing also makes possible films or powders with very uniform compositions and/or doping profiles.

The metal precursors used in MOD processing preferably are high purity, non-toxic, and easy to handle and store (with long shelf lives). Desirable physical properties include solubility in solvent systems, compatibility with other precursors for multi-component synthesis, and volatility for low temperature processing. Thus, liquid or solid precursors with low melting points are desired.

Intermetallics can be obtained from mixtures of precursors or from single source precursor molecules in which two or more metallic elements or semi-metallic elements are chemically associated. The desired stoichiometry of the resultant film or powder can match the stoichiometry of the pre-alloy precursor solution.

An aspect of the method described herein for making intermetallic coatings and powders is that a commercially desirable stoichiometry can be obtained. For example, the desired atomic ratio in the intermetallic compound can be achieved by selecting a precursor or mixture of precursors having a ratio of first metal atoms to second metal atoms that is equal to the desired atomic ratio in the intermetallic compound.

The metal precursor compounds are preferably metallo-organic compounds, which have a central main group, transition, lanthanide, or actinide metal atom or atoms bonded to a bridging atom (e.g., N, O, P or S) that is in turn bonded to an organic radical. Examples of the main group metal atom include, but are not limited to Mg, Al, Ti, Fe, Co, Ni, Cu, Zn, Mo, Ru, Rh, Pd, Ag, Sn, Ce, W, Re, Os, Ir, Pt and Au. Such compounds may include metal alkoxides, β-diketonates, carboxylates, oxalates, citrates, metal hydrides, thiolates, amides, nitrates, carbonates, cyanates and hydrates thereof. The metal precursor can also be a so-called organometallic compound, wherein a central metal atom is bonded to one or more carbon atoms of an organic group. Traditionally, organic derivatives of the metalloids (B, Si, Ge, As and Te) are also included.

Metal alkoxides have both good solubility and volatility and are readily applicable to MOD processing. Generally, however, these compounds are highly hygroscopic and require storage under inert atmosphere. In contrast to silicon alkoxides, which are liquids and monomeric, the alkoxides based on most metals are solids. On the other hand, the high reactivity of the metal-alkoxide bond can make these precursor materials useful as starting compounds for a variety of heteroleptic species (i.e., species with different types of ligands) such as $M(OR)_{n-x}Z_x$ ($Z$=β-diketonate or $O_2CR$).

Metal alkoxides $M(OR)_n$ react easily with the protons of a large variety of molecules. This allows easy chemical modification and thus tuning of properties by using, for example, organic hydroxy compounds such as alcohols, silanols ($R_3SiOH$), glycols $OH(CH_2)_nOH$, carboxylic and hydroxy-carboxylic acids, hydroxyl surfactants, etc.

Modification of alkoxides reduces the number of M-OR bonds available for hydrolysis and thus hydrolytic susceptibility. Thus, it is possible to control the solution chemistry in situ by using, for example, β-diketonates (e.g., acetylacetonate) or carboxylic acids (e.g., acetic acid) as modifiers for, or in lieu of, the alkoxide.

Metal β-diketonates $[M(RCOCHCOR')_n]_m$ are attractive precursors for MOD processing because of their volatility and high solubility. Their volatility is governed largely by the bulk of the R and R' groups as well as the nature of the metal, which will determine the degree of association, m, according to the formula above. Acetylacetonates ($R=R'=CH_3$) are advantageous because they can provide good yields.

Metal β-diketonates are prone to a chelating behavior that can lead to a decrease in the nuclearity of these precursors. These ligands can act as surface capping reagents and polymerization inhibitors. Thus, small particles can be obtained after hydrolysis of $M(OR)_{n-x}(\beta\text{-diketonate})_x$. Acetylacetone can, for instance, stabilize nanoscale colloids.

Carboxylates such as acetates ($M(O_2CMe)_n$) are commercially available as hydrates of Li or Pb, which can be rendered anhydrous by heating with acetic anhydride or with 2-methoxyethanol. Many carboxylates generally have poor solubility in organic solvents and, because carboxylate ligands act mostly as bridging-chelating ligands, readily form oligomers or polymers. However, 2-ethylhexanoates ($M(O_2CCHEt_nBu)_n$), which are the carboxylates with the smallest number of carbon atoms, are generally soluble in most organic solvents. A large number of carboxylate derivatives are available for aluminum. For example, formate $Al(O_2CH)_3(H_2O)$ and carboxylate-alumoxanes $[AlO_x(OH)_y(O_2CR)_z]_m$ can be prepared from the inexpensive minerals gibsite or boehmite.

Fluorinated alkoxides $M(OR_F)_n$ ($R_F=CH(CF_3)_2$, $C_6F_5$, ...) are readily soluble in organic solvents and less susceptible to hydrolysis than classical alkoxides. These materials can be used as precursors for fluorides, oxides or fluoride-doped oxides such as F-doped tin oxide.

Multicomponent materials can be prepared from mixed metal (hetero-metallic) precursors or, alternatively, from a mixture of single metal (homo-metallic) precursors. According to a preferred embodiment, two or more single metallic precursors can be mixed to prepare a liquid mixture, which can be processed to form an intermetallic film or powder.

The use of multiple single metal precursors has the advantage of flexibility in designing precursor rheology as well as product stoichiometry. Hetero-metallic precursors, on the other hand, may offer access to metal systems whose single metal precursors have undesirable solubility, volatility or compatibility.

Mixed-metal species can be obtained via Lewis acid-base reactions or substitution reactions by mixing alkoxides and/or other precursors such as acetates, β-diketonates or nitrates. Because the combination reactions are controlled by thermodynamics, however, the stoichiometry of the hetero-compound once isolated may not reflect the composition ratios in the mixture from which it was prepared. On the other hand, most metal alkoxides can be combined to produce hetero-metallic species that are often more soluble than the starting materials.

The solvent(s) used in MOD processing are selected based on a number of criteria including high solubility for the precursor compounds; chemical inertness to the precursor compounds; rheological compatibility with the deposition technique being used (e.g. the desired viscosity, wettability and/or compatibility with other rheology adjusters); boiling point; vapor pressure and rate of vaporization; and economic factors (e.g. cost, recoverability, toxicity, etc.).

Solvents that may be used in MOD processing include pentanes, hexanes, cyclohexanes, xylenes, ethyl acetates, toluene, benzenes, tetrahydrofuran, acetone, carbon disulfide, dichlorobenzenes, nitrobenzenes, pyridine, methyl alcohol, ethyl alcohol, butyl alcohol, and mineral spirits.

Thin films can be prepared by coating a substrate or support with a liquid mixture having the desired stoichiometry. Thin films can be used to modify the reflectivity of a surface, altering its rigidity, or modifying its surface chemistry. In addition to the metal precursor and solvent, the liquid mixture may contain rheology controlling additives that can improve, for example, the wettability of the liquid mixture to the substrate or support.

By chemically modifying the liquid mixture, film formation can be improved. The addition of a chelating agent, for example acetic acid, can generate a highly dense polymer network in solution that can improve the chemical homogeneity of the liquid mixture as well as the physical homogeneity of the resulting film. A solution modified with a chelating agent (polymer former) is generally resistant to hydrolysis and condensation, and the modified solution generally comprises high polymers rather than small colloidal particles. A highly dense, highly mixed polymer network can be processed at lower temperatures than a lower density network.

As described above, nanoscale powders of intermetallics can be prepared by low temperature thermal decomposition of mixtures of metallo-organic compounds. By "nanoscale" is meant that the powder particles have an average size of less than about 100 nanometers. The nanoparticles can have an average particle size less than about 100 nm, preferably less than about 50 nm, more preferably less than about 10 nm.

According to a preferred embodiment, a first metal precursor comprising a first metal can be combined with a second metal precursor comprising a second metal to form a liquid mixture. Alternatively, as described above, a single metal precursor comprising first and second metals can be used. By heating the liquid mixture, first and second metal atoms can combine to form an intermetallic compound. The intermetallic compound can be formed as a coating or as a powder such as a nanoscale powder.

According to another preferred embodiment, a first metal precursor can be combined with a second metal to form a liquid mixture. By heating the liquid mixture, metal atoms from the first metal precursor and metal atoms from the second metal can combine to form an intermetallic compound. The second metal can be in the form of a nanoscale metal powder such as a nanoscale powder comprising Mg, Al, Ti, Fe, Co, Ni, Cu, Zn, Mo, Ru, Rh, Pd, Ag, Sn, Ce, W, Re, Os, Ir, Pt, Au and mixtures thereof.

Also provided is a method of making supported intermetallic nanoscale particles. A metal precursor solution may be contacted with a substrate or support in a number of ways. For example, the precursor may be dissolved or suspended in a liquid, and the substrate may be mixed with the liquid having the dispersed or suspended precursor. The dissolved or suspended precursor can be adsorbed onto a surface of the substrate or absorbed into the substrate. The metal precursor may also be deposited onto a surface of the substrate by removing the liquid, such as by evaporation so that the precursor remains on the support. The liquid may be substantially removed from the substrate during or prior to thermally treating the metal precursor, such as by heating the substrate at a temperature higher than the boiling point of the liquid or by reducing the pressure of the atmosphere surrounding the substrate.

Thermal treatment causes decomposition of the precursor(s) whereby the metal atoms may combine under thermal treatment to form an intermetallic compound having an atomic ratio approximately equal to the stoichiometric ratio of the first metal to the second metal in the precursor solution.

In one embodiment, a support is contacted with a metal precursor solution and the contacted support is heated in the substantial absence of an oxidizing atmosphere. In an alternative embodiment, the support is contacted with a metal precursor solution and the contacted support is heated to a decomposition temperature in the presence of an oxidizing atmosphere and then heated to a reaction temperature in the substantial absence of an oxidizing atmosphere.

The precursor-contacted support is preferably heated to a temperature equal to or greater than the thermal decomposition temperature of the metal precursor(s). The preferred heating temperature depends on the particular ligands used as well as on the degradation temperature of the metal(s) and any other desired groups which are to remain. However, the preferred decomposition temperature is from about 200° C. to 350° C., and the preferred reaction temperature is from about 400° C. to 750° C. The heating of the precursor-contacted substrate can occur in an inert, oxidizing and/or reducing atmosphere.

The substrate may be a bulk article or a nanoscale article such as particulate carbon or aluminum. The substrate may include substantially any material which, when heated to a temperature at which a metal precursor is converted to a metal on the surface thereof, does not melt, vaporize completely, or otherwise become incapable of supporting intermetallic particles.

In an embodiment of the method using a liquid mixture, the precursors or precursor-coated support can be heated to a decomposition temperature in the presence of an oxidizing atmosphere from about room temperature (about 25° C.) to a temperature sufficient to remove the liquid and/or initiate decomposition of the precursor(s), preferably to a temperature from about 200 to about 350° C. Alternatively, the precursor solution can be heated to a decomposition temperature in the absence of an oxidizing atmosphere. The decomposition temperature preferably is sufficient to initiate reduction of the metal constituents present in the metal precursor(s). Heating to a decomposition temperature can transform the precursor mixture to a film or powder mixture.

The powder mixture, which may be coated on a support material, can then be heated to a reaction temperature in the presence or absence of an oxidizing atmosphere. Heating to the reaction temperature can result in the formation of amorphous and/or crystalline intermetallic particles, optionally dispersed within and/or on a surface of the support.

It is preferred that heating to the reaction temperature is done in the substantial absence of an oxidizing atmosphere. For example, it is preferred that the powder mixture, with or without a support, is heated to the reaction temperature in a reducing atmosphere. A reducing atmosphere may comprise hydrogen or a hydrogen-containing gas, such as mixture of hydrogen and one or more of nitrogen, argon, helium or other inert gases (e.g., a mixture of about 10 volume percent hydrogen and about 90 volume percent nitrogen). By way of example, the steps of heating to a decomposition temperature and heating to a reaction temperature can be performed in a conventional furnace (e.g., tube furnace, box furnace, rapid thermal annealing furnace) or an infrared lamp.

According to a further embodiment, once formed, an intermetallic compound can be combined with a support material. For example, the intermetallic powders as described above may be provided along the length of a tobacco rod by distributing the intermetallic powders on the tobacco or cigarette paper or incorporating them into the cut filler tobacco or cigarette paper using any suitable method. The intermetallics may be combined with a support material in the form of a powder or the intermetallic can be in a solution in the form of a dispersion. Intermetallics in the form of a dry powder can be dusted on the cut filler tobacco and/or cigarette paper. The intermetallics may also be present in the form of a dispersion and sprayed on the cut filler tobacco and/or cigarette paper. The intermetallics may also be added to the cut filler tobacco stock supplied to the cigarette making machine or added to a tobacco column prior to wrapping cigarette paper around the tobacco column. The steps of heating a liquid mixture comprising a metal precursor to a temperature sufficient to thermally decompose the precursor and form an intermetallic compound can be performed prior to adding the intermetallic to the cigarette.

The intermetallics will preferably be distributed throughout the tobacco rod portion of a cigarette, the cigarette paper wrapper and optionally the cigarette filter. By providing the intermetallics throughout the tobacco rod, it is possible to reduce the amount of carbon monoxide drawn through the cigarette.

The amount of the intermetallic can be selected such that the amount of carbon monoxide or other gaseous species in mainstream smoke (e.g., 1,3-butadiene) is reduced during smoking of a cigarette. The term "mainstream" smoke refers to the mixture of gases passing down the tobacco rod through the filter end, i.e., the amount of smoke issuing or drawn from the mouth end of a smoking article during smoking. Preferably, the amount of the intermetallic will be a catalytically effective amount, e.g., from about a few milligrams, for example, 5 mg/cigarette, to about 100 mg/cigarette. More preferably, the amount of intermetallic will be from about 40 mg/cigarette to about 50 mg/cigarette.

One embodiment relates to a cut filler composition comprising tobacco and at least one intermetallic, as described above, which is capable of acting as a catalyst for the conversion of carbon monoxide to carbon dioxide.

Any suitable tobacco mixture may be used for the cut filler. Examples of suitable types of tobacco materials include flue-cured, Burley, Maryland or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The invention may also be practiced with tobacco substitutes.

In cigarette manufacture, the tobacco is normally employed in the form of cut filler, i.e. in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g. burn additives, combustion modifying agents, coloring agents, binders, etc.) known in the art.

Another embodiment relates to a cigarette comprising a tobacco rod, wherein the tobacco rod comprises cut filler having at least one intermetallic, as described above, which is capable of acting as a catalyst for the conversion of carbon monoxide to carbon dioxide. A further embodiment relates to a method of making a cigarette, comprising (i) adding an intermetallic to at least one of a cut filler and a cigarette paper wrapper; (ii) providing the cut filler to a cigarette making machine to form a tobacco column; and (iii) placing the paper wrapper around the tobacco column to form a tobacco rod of a cigarette.

Techniques for cigarette manufacture are known in the art. Any conventional or modified cigarette making technique may be used to incorporate the intermetallic in the cut filler. The resulting cigarettes can be manufactured to any known specifications using standard or modified cigarette making techniques and equipment. Typically, the cut filler composition is optionally combined with other cigarette additives, and provided to a cigarette making machine to produce a tobacco rod, which is then wrapped in cigarette paper, and optionally tipped with filters.

Cigarettes may range from about 50 mm to about 120 mm in length. Generally, a regular cigarette is about 70 mm long, a "King Size" is about 85 mm long, a "Super King Size" is about 100 mm long, and a "Long" is usually about 120 mm in length. The circumference is from about 15 mm to about 30 mm in circumference, and preferably around 25 mm. The packing density is typically between the range of about 100 $mg/cm^3$ to about 300 $mg/cm^3$, and preferably 150 $mg/cm^3$ to about 275 $mg/cm^3$.

Yet another embodiment relates to a method of smoking the cigarette described above, which involves lighting the cigarette to form smoke and drawing the smoke through the cigarette, wherein during the smoking of the cigarette, the intermetallic acts as an oxidant and/or catalyst for the conversion of carbon monoxide to carbon dioxide.

The following provide examples of the present invention.

EXAMPLE 1

Copper acetylacetonate and zinc acetylacetonate were dissolved in an organic solvent, combined to form a liquid mixture that was 50 wt. % Cu and 50 wt. % Zn, and heated in a tube furnace to about 300° C. to remove the solvent and form a powder mixture comprising Cu metal and zinc oxide. The powder mixture was heated to a temperature of 650° C. in argon to form a nanoscale brass ($Cu_{0.5}Zn_{0.5}$) powder.

EXAMPLE 2

Copper (II) ethylhexanoate and zinc (II) ethylhexanoate were dissolved in mineral spirits and intimately mixed to form a liquid mixture. The liquid mixture comprised 50 wt. % Cu and 50 wt. % Zn. The liquid mixture was heated in a tube furnace in air to about 300° C. to remove the solvent and form a powder mixture comprising Cu metal and zinc oxide. The powder mixture was heated to a temperature of 650° C. in argon to form a nanoscale brass ($Cu_{0.5}Zn_{0.5}$) powder.

EXAMPLE 3

The copper-zinc liquid mixture of Example 1 was dispersed drop-wise onto a substrate. During the deposition step, the liquid mixture was exposed to heat from an infrared lamp at a temperature of about 200-250° C. This process resulted in the deposition of a coating comprising Cu metal and zinc oxide on the substrate as the droplets struck the substrate.

EXAMPLE 4

The copper-zinc solution of Example 1 was spin-coated onto a ceramic substrate. Following the deposition step, the coated substrate was heated to a temperature of about 200-250° C. in air and then to a temperature of 600° C. in argon resulting in a uniform brass ($Cu_{0.5}Zn_{0.5}$) coating on the substrate.

EXAMPLE 5

The copper-zinc solution of Example 1 was infiltrated into the porous surface of silica gel beads. Following the deposition step, the coated silica gel was heated to a temperature of about 200-250° C. in an inert atmosphere (Ar or He) resulting in the deposition of nanoscale brass particles on the surface of the silica gel.

EXAMPLE 6

Iron ethylhexanoate and aluminum ethylhexanoate dissolved in mineral spirits were mixed thoroughly to form a liquid mixture. The liquid mixture was heated in a tube furnace about 300° C. to produce a nanoscale iron aluminide (FeAl) powder.

EXAMPLE 7

Iron ethylhexanoate was mixed with nanoscale particles of aluminum metal to form a liquid mixture. X-ray diffraction patterns taken after heating the liquid mixture in a tube furnace are shown in FIG. 1. After heating to 243° C. (FIG. 2B), the diffraction pattern shows aluminum metal and low angle diffraction corresponding to the iron precursor. A nanoscale iron aluminide ($Fe_{0.5}Al_{0.5}$) powder was formed after heating to a reaction temperature of 750° C. (FIG. 2A).

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

What is claimed is:

1. A method of making an iron aluminide intermetallic compound comprising:
   forming a liquid mixture containing a first metal precursor and a second metal;
   applying the liquid mixture to a support;
   preparing a powder mixture by heating the liquid mixture to a temperature in a first temperature range of from about 200 to 350° C. so as to dry the liquid mixture and convert the first metal precursor to a first metal; and
   heating the powder mixture to a temperature in a second temperature range of from about 400 to 750° C. so as to form an iron aluminide intermetallic compound film on the support by a solid state reaction between the first and second metals,
   wherein the first metal precursor comprises a metallo-organic compound.

2. The method according to claim 1, comprising combining the second metal with the first metal precursor wherein the first metal precursor consists essentially of a metallo-organic compound.

3. The method according to claim 2, wherein the metallo-organic compound is selected from the group consisting of ethyl hexanoates, acetyl acetonates, oxalates and citrates.

4. The method according to claim 1, comprising forming a liquid mixture that consists essentially of the first metal precursor, the second metal and a solvent.

5. The method according to claim 1, wherein the support is selected from the group consisting of a ceramic, metal, plastic or paper.

6. The method according to claim 1, wherein the support is porous.

7. The method according to claim 1, wherein the liquid mixture is applied to the support by spraying, dipping or spin coating.

8. The method according to claim 1, wherein the step of applying the liquid mixture to the support and the step of heating the liquid mixture are performed simultaneously.

9. The method according to claim 1, wherein the support is selected from the group consisting of silica gel beads, carbon/graphite foam, activated carbon and cut filler.

10. The method according to claim 1, further comprising forming a liquid mixture that comprises a polymer former.

11. The method according to claim 1, wherein the steps of heating comprise infrared heating or furnace heating.

12. The method according to claim 1, wherein the step of heating to a second temperature range comprises heating in a non-oxidizing atmosphere.

13. The method according to claim 1, wherein the step of applying the liquid mixture to the support and the step of heating the liquid mixture comprise heating in a non-oxidizing atmosphere.

14. The method of claim 1, wherein the step of applying the liquid mixture to the support and the step of heating the liquid mixture comprise heating in a reducing atmosphere.

15. The method according to claim 1, wherein the step of applying the liquid mixture to the support and the step of heating the liquid mixture comprise heating at about atmospheric pressure.

16. A method of making an iron aluminide intermetallic compound comprising:
   forming a mixture containing a solvent, a first metal precursor and a second metal;
   applying the liquid mixture to a support; and
   preparing an iron aluminide film on the support by heating the mixture to a decomposition temperature of about 200° C. to about 350° to initiate reduction of metal constituents in the first metal precursor to a first metal and heating the at least partially reduced first metal precursor and the second metal to a reaction temperature from about 450° C. to 750° C. to form an amorphous and/or crystalline iron aluminide intermetallic film on the support by a solid state reaction between the first metal and the second metal; and
   wherein the first metal precursor comprises metal alkoxides, β-diketonates, carboxylates, citrates, metal hydrides, thiolates, amides, nitrates, carbonates, oxalates and/or hydrates thereof.

17. The method according to claim 16, wherein the first metal precursor is selected from the group consisting of ethyl hexanoates, acetyl acetonate, and citrates.

* * * * *